No. 855,283. PATENTED MAY 28, 1907.
W. H. COMPTON.
MANURE FORK.
APPLICATION FILED OCT. 8, 1906.
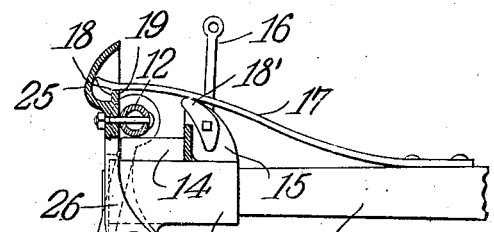
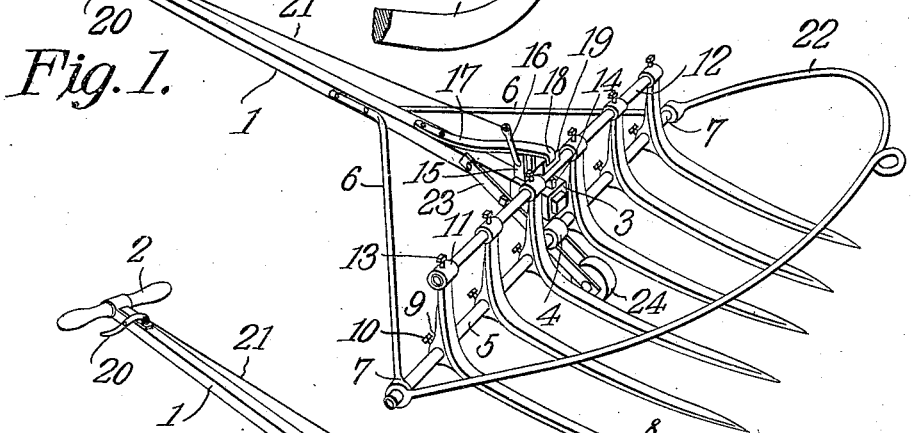
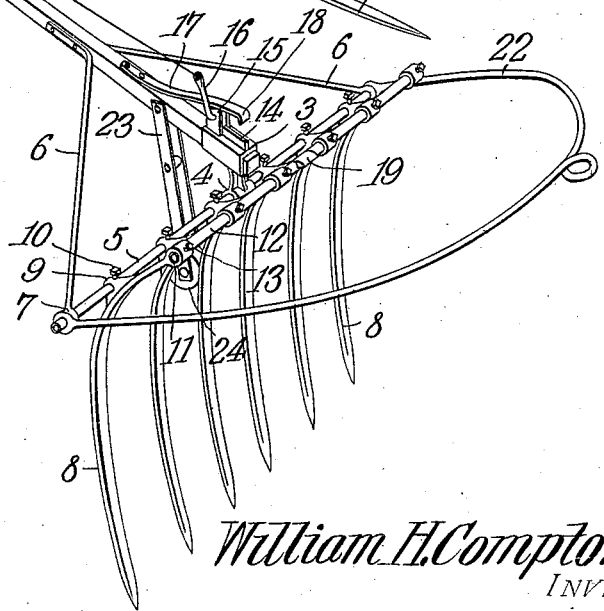
WITNESSES:
William H. Compton,
INVENTOR
By C. A. Snow & Co.
ATTORNEYS

UNITED STATES PATENT OFFICE.

WILLIAM H. COMPTON, OF MINNEAPOLIS, MINNESOTA.

MANURE-FORK.

No. 855,283.　　　　Specification of Letters Patent.　　　　Patented May 28, 1907.

Application filed October 3, 1906. Serial No. 337,240.

*To all whom it may concern:*

Be it known that I, WILLIAM H. COMPTON, a citizen of the United States, residing at Minneapolis, in the county of Hennepin and State of Minnesota, have invented a new and useful Manure-Fork, of which the following is a specification.

This invention has relation to manure forks and it consists in the novel construction and arrangement of its parts as hereinafter shown and described.

The object of the invention is to provide a fork of the character indicated which comprises a series of tines attached to parallel cross bars and being capable of lateral adjustment thereon. One of the said cross bars is journaled to a handle staff and constitutes a supporting member for the tines. A spring catch is mounted upon the handle staff and is adapted to engage a lug provided upon the other cross bar, and by means of which the said tines may be fixed with relation to the handle staff. A lever is fulcrumed upon the handle staff and is adapted to engage the spring catch for the purpose of raising the same and disengaging the end thereof from said lug so that the tines may swing with relation to the handle staff. A bail is pivotally attached to the cross bar that is journaled to the handle staff and suitable means is provided upon the handle staff for operating said lever. A link is pivotally attached to the handle staff and carries a ground wheel which is adapted to run under the rear ends of the tines and reduce the friction as the implement is drawn over the ground.

In the accompanying drawing, Figure 1 is a perspective view of the fork showing the tines fixed with relation to the handle staff. Fig. 2 is a perspective view of the fork showing the tines swung down with relation to the handle staff, and Fig. 3 is a side elevation of a portion of the implement showing a modified form of hinged connection between the handle staff and tines supporting cross-rod.

The handle staff 1 is provided at its outer end with the transversely extending handle grips 2 and at its other end enters a metallic collar 3. The cylindrical bearing 4 depends from the lower side of the collar 3 and the cross-rod 5 is journaled in the said bearing. The braces 6 are attached at their inner ends to the handle staff 1 and at their outer ends are provided with the eyes 7 which receive the outer portion of the cross rod 5. The tines 8 are upwardly curved at their rear ends and are provided upon their under side and at their curved portions with the perforated lugs or webs 9 which receive the cross-bar 5. The set screws 10 pass through the web 9 and engage the cross-bar 5 and fix the tines with relation to the same. The upper ends of the tines 8 are provided with the sleeves 11 through which the cross-rod 12 passes. Said sleeves are provided with set screws 13 which engage the said cross rod 12 and fix the upper ends of the tines 8 with relation thereto. By loosening the set screws 10 and 13 the tines may be adjusted along the rods 5 and 12. The upper side of the collar 3 is provided with a rib 14 upon which the cross-rod 12 is adapted to swing and rest. The spaced lugs 15, 15 are located behind the rib 14 and the lever 16 is fulcrumed in the said lugs 15. The spring 17 is attached to the handle staff 1 and is provided at its free end with a catch 18. An intermediate portion of the spring 17 passes over the upper ends of the lugs 15. The cam 18' is located in the space between the lugs 15 and is attached to the lever 16 and is adapted to engage the under side of the spring 17.

In the form of the invention as shown in Figs. 1 and 2 the cross rod 12 is provided with the lug 19, which is adapted to be caught under the catch 18 of the spring 17 when the cross rod 12 is resting upon the rib 14 of the collar 3. The operating lever 20 is fulcrumed to the handle staff 1 in the vicinity of the handle grips 2 and the rod 21 connects the lever 20 with the lever 16. The bail 22 is pivoted at its ends to the outer portions of the cross-rod 5. The said cross-rods 5 and 12 are preferably cut from iron pipe. The link 23 is pivoted to the handle staff 1 and is provided at its lower end with the ground wheel 24 which may be swung under the inner portion of the tines 8 for the purpose of raising the same from the ground as they are drawn over the surface thereof.

In the form of the invention as illustrated in Fig. 3 the lug 19 is not located directly upon the cross rod 12 but is housed within the casing 25 which in turn is bolted to the side of the cross bar 12 and which is provided with the depending portion 26 which receives the cross rod 5. Thus the said cross rods are additionally braced with relation to each other.

From the foregoing description it is obvious that as the fork is drawn over the ground and the parts are in the positions as shown in Fig. 1 the material will be collected upon the tines and when the same have become sufficiently loaded the implement may be drawn to a wagon and then elevated when the operator will pull the lever 20 which in turn will operate the lever 16 through the connecting rod 21 and the cam 18 will elevate the free end of the spring 17 out of engagement with the lug 19 when the tines 8 will swing down into the positions as shown in Fig. 2 and the material will be dumped.

Having described my invention what I claim as new and desire to secure by Letters Patent is:—

1. A fork comprising a handle staff, a cross-rod journaled thereto, tines mounted upon said cross-rod, a cross-rod connecting the ends of said tines together and having a lug attached thereto, a spring attached to the handle shaft and adapted to engage said lug, a lever fulcrumed upon the handle staff and having a cam adapted to engage said spring and means for operating said lever.

2. A fork comprising a handle staff, a cross-rod journaled thereto, tines mounted upon said cross-rod, a second cross-rod connecting said tines together and having a lug attached thereto, a collar located upon the handle staff and having a rib located in the path of the second said rod, a spring mounted upon the handle staff and having an end for engagement with said lug, a lever fulcrumed upon the handle staff and having a cam adapted to engage said spring and a means for operating said lever.

3. A fork comprising a handle staff, a collar located thereon and having a depending bearing, a cross-rod journaled in said bearing, tines mounted upon said cross-rod, a second cross-rod connecting said tines together and having a lug attached thereto, a spring mounted upon the handle staff and adapted to engage the said lug and means for forcing said spring out of engagement with said lug.

4. A fork comprising a handle staff, a collar located thereon and having a depending bearing, a cross-rod journaled in said bearing, tines attached to said cross-rod, a second cross-rod connecting said tines together and having a lug attached thereto, said collar having a rib located in the path of said second cross-rod, said collar also having spaced lugs located at the rear of said rib, a spring attached to the handle staff and adapted to engage said lug of said second cross-rod, a lever fulcrumed between the lugs carried by said collar, a cam located between the last said lugs and being attached to the said lever and adapted to engage the said spring and means for operating said lever.

5. A fork comprising a handle staff, a series of tines journaled thereto, said handle staff having means for holding said tines in relatively fixed position, a link pivoted to the handle staff, a ground wheel journaled to said link and adapted to be swung under said tines.

6. A fork comprising a handle staff, a cross-rod journaled thereto, tines mounted upon said cross-rod, a second cross-rod connecting said tines together, a casting fixed to the second said cross-rod and having depending perforated portions which receive the first said cross-rod and spring mechanism attached to the handle for engagement with said casting.

In testimony that I claim the foregoing as my own, I have hereto affixed my signature in the presence of two witnesses.

WILLIAM H. COMPTON.

Witnesses:
M. A. GRAETTINGER,
F. BODDER.